US012780640B2

(12) United States Patent
Prevotat

(10) Patent No.: US 12,780,640 B2
(45) Date of Patent: Nov. 3, 2026

(54) DEVICE FOR PREPARING AND DISPENSING BEVERAGES WITH AN IMPROVED ARRANGEMENT OF SOLENOID VALVES

(71) Applicant: SOCIETE DES PRODUITS NESTLE S.A., Vevey (CH)

(72) Inventor: Francois Prevotat, Divonne les bains (FR)

(73) Assignee: Société des Produits Nestlé S.A., Vevey (CH)

( * ) Notice: Subject to any disclaimer, the term of this patent is extended or adjusted under 35 U.S.C. 154(b) by 105 days.

(21) Appl. No.: 18/861,370

(22) PCT Filed: Apr. 28, 2023

(86) PCT No.: PCT/EP2023/061231
§ 371 (c)(1),
(2) Date: Oct. 29, 2024

(87) PCT Pub. No.: WO2023/213706
PCT Pub. Date: Nov. 9, 2023

(65) Prior Publication Data

US 2025/0289701 A1 Sep. 18, 2025

(30) Foreign Application Priority Data

May 4, 2022 (IT) ........................ 102022000009056

(51) Int. Cl.

| | |
|---|---|
| ***B67D 1/00*** | (2006.01) |
| ***B67D 1/08*** | (2006.01) |
| ***B67D 1/12*** | (2006.01) |

(52) U.S. Cl.
CPC ......... *B67D 1/0036* (2013.01); *B67D 1/0857* (2013.01); *B67D 1/1204* (2013.01);
(Continued)

(58) Field of Classification Search
CPC .. B67D 1/0036; B67D 1/0857; B67D 1/1204; B67D 2210/00041; B67D 2210/00049;
(Continued)

(56) References Cited

U.S. PATENT DOCUMENTS

| | | |
|---|---|---|
| 2,894,377 A | 7/1959 | Shikles, Jr. et al. |
| 3,409,176 A | 11/1968 | Krause |

(Continued)

OTHER PUBLICATIONS

International Search Report for International Application No. PCT/EP2023/061231 mailed Jul. 12, 2023, 5 pages.

(Continued)

*Primary Examiner* — David J Walczak
(74) *Attorney, Agent, or Firm* — Thorpe North & Western, LLP

(57) ABSTRACT

A machine (10) for preparing and dispensing beverages can comprise at least one beverage preparation apparatus (18), which is designed for preparing and dispensing beverages, and at least one water supply apparatus (20), which is provided with one or more water delivering pipes (22) to the beverage preparation apparatus (18), and with one or more solenoid valves (50, 52, 54) each coupled to a respective water delivery pipe; wherein the solenoid valves (50, 52, 54) are positioned within an housing chamber at a door compartment of a main casing (12) to be immediately and easily accessible when the door (16) is open during respective adjustment and/or maintenance operations.

19 Claims, 7 Drawing Sheets

(52) U.S. Cl.
CPC .............. *B67D 2210/00041* (2013.01); *B67D 2210/00049* (2013.01)

(58) Field of Classification Search
CPC .......... B67D 1/005; B67D 2210/00047; B67D 2210/00062
USPC ............ 222/145.7, 129.1, 129.4, 132, 145.1; 312/236; 62/390, 391, 394
See application file for complete search history.

(56) References Cited

U.S. PATENT DOCUMENTS

| | | | | |
|---|---|---|---|---|
| 4,376,496 | A | 3/1983 | Sedam et al. | |
| 7,997,448 | B1 * | 8/2011 | Leyva | B67D 1/1247<br>222/1 |
| 2003/0097314 | A1 | 5/2003 | Crisp, III et al. | |
| 2010/0242497 | A1 * | 9/2010 | Bertone | A23G 9/28<br>62/344 |

OTHER PUBLICATIONS

Written Opinion of the International Searching Authority for International Application No. PCT/EP2023/061231 mailed Jul. 12, 2023, 9 pages.

* cited by examiner

DEVICE FOR PREPARING AND DISPENSING BEVERAGES WITH AN IMPROVED ARRANGEMENT OF SOLENOID VALVES

CROSS REFERENCE TO RELATED APPLICATIONS

The present application is a National Stage of International Application No. PCT/EP2023/061231, filed on Apr. 28, 2023, which claims priority to Italy Patent Application No. 102022000009056, filed on May 4, 2022, the entire contents of which are being incorporated herein by reference.

FIELD OF THE INVENTION

The present invention relates a machine for preparing and dispensing beverages in general and, in particular, a machine which can be part of a system for automatic supplying beverages. This machine can be used to prepare a wide range of beverages. Such beverages are usually made of water and at least an additive substance for beverages, such as syrups, flavorings, etc.

BACKGROUND OF THE INVENTION

As known, machines generically comprising at least a water supply apparatus, at least an additive substances feeding apparatus of additive substances to be mixed with water and at least a beverage preparation apparatus can be used to prepare beverages made of water and at least an additive substance. The beverage preparation apparatus makes either the mixing of the water with one or more additive substances, to obtain the desired beverage, and the subsequent dispensing of such a beverage toward one or more containers to be used by the consumer, such as glasses, bottles and/or canteens. These machine for preparing and dispensing beverages are also provided with at least a door which allows access to the apparatuses, and on which is usually defined a cavity, or alcove, within which the user can insert the container to obtain the desired beverage.

The water supply apparatus is usually provided with a plurality of solenoid valves which allow to deliver water to the beverage preparation apparatus. It can be provided a single solenoid valve for each of the water type (refrigerated water, ambient temperature water, carbonated water, etc.) to be delivered to the beverage preparation apparatus.

The solenoid valves of the water supply apparatus are usually arranged inside the machine for preparing and dispensing beverages in a random way in a random way. This can lead to difficulties in accessing the solenoid valves, especially in case of adjustment of the solenoid valves and/or for further maintenance operations of the same.

SUMMARY OF THE INVENTION

The object of the present invention is therefore to provide a machine for preparing and dispensing beverages able to solve the aforementioned prior art drawback in a simple, inexpensive and functional way.

In more details, an object of the present invention is to provide a machine for preparing and dispensing beverages which allows an easy and direct access to the solenoid valves of the water supply apparatus.

This and further objects according to the present invention are achieved by a machine for preparing and dispensing beverages according to claim 1. Further features of the invention are highlighted by the dependent claims, which are an integral part of the present description.

The machine for preparing and dispensing beverages according to the present invention comprises:

- a main casing, able to define a housing chamber of a plurality of apparatuses of the machine and provided with at least one opening which defines a door compartment to the housing chamber;
- at least one door, which is provided with an outer surface and an inner surface oriented towards the housing chamber, wherein the door is hinged to the main casing at a hinging axis and is configured to close the door compartment in the machine operating configuration;
- at least one beverage preparation apparatus, which is designed for preparing and dispensing beverages;
- at least one water supply apparatus, which is provided with one or more water delivering pipes to the beverage preparation apparatus, and with one or more solenoid valves each coupled to a respective water delivery pipe; and
- at least one additive substances feeding apparatus, which is provided with one or more additive substances delivering pipes to the beverage preparation apparatus;

wherein the beverage preparation apparatus comprises:

- at least one mixing and dispensing nozzle; and
- at least one alcove, which is obtained on the door and which defines a seat open on the outer surface of the door to hold at least one container into which the beverage dispensed through the nozzle flows;

wherein the solenoid valves are positioned within the housing chamber at the door compartment of the main casing to be immediately and easily accessible when the door is open during respective adjustment and/or maintenance operations.

According to an embodiment, the solenoid valves are positioned in front of one or more apparatuses of the machine which are arranged within the housing chamber.

According to an embodiment, the water supply apparatus is provided with at least one water chilling unit, wherein the solenoid valves are positioned in front of the water chilling unit.

According to an embodiment, the solenoid valves are mounted on a single support frame which is arranged within the housing chamber at the door compartment of the main casing so as to be opposite to the door when the door is closed.

According to an embodiment, the solenoid valves are at least partially covered by a respective protection carter.

According to an embodiment, the solenoid valves are each mounted at a different height from the others with respect to a support surface of the machine.

According to an embodiment, the water delivery pipes are provided with respective delivery pipe portions exiting from respective solenoid valves, wherein the delivery pipe portions are oriented towards the hinging axis of the door.

According to an embodiment, the water supply apparatus and the additive substances feeding apparatus are arranged within the housing chamber and all the water delivery pipes and all the additive substances delivering pipes are hydraulically connected to the nozzle, which is designed for mixing water with the additive substances, so as to obtain the beverage, and for delivering the beverage, wherein the nozzle is fixed to the alcove to ensure easy access to the apparatuses of the machine arranged within the housing chamber when the door is open.

According to an embodiment, the water delivery pipes and the additive substances delivering pipes are provided with respective pipe end portions for connection to the nozzle, wherein the pipe end portions are grouped together so as to form at least one single end tube bundle placed at the nozzle.

According to an embodiment, the water delivery pipes and the additive substances delivering pipes are provided with respective pipe end portions for connection to the nozzle, wherein at least one part of the pipe end portions is provided with one or more flow control devices able to identify the passage of fluid in the pipe end portions, which are electrically connected to an electronic control unit of the machine.

According to an embodiment, the flow control devices are electrically connected to an electronic control unit of the machine by means of respective electric cables incorporated in the single tube bundle.

According to an embodiment, the water delivery pipes and the additive substances delivering pipes are provided with respective pipe intermediate portions which are grouped and joined together in an area of the housing chamber close to the hinging axis of the door, in such a way that the pipe intermediate portions form respective intermediate tube bundles that occupy the least possible space inside the housing chamber, improving accessibility to the apparatuses of the machine.

According to an embodiment, when the door is open, both the intermediate tube bundle of the water delivery pipes and the intermediate tube bundle of the additive substances delivering pipes come out from the upper corner of the housing chamber, placed at the hinging axis of the door, to connect to the nozzle.

According to an embodiment, at least one protection element to prevent the water delivery pipes and the additive substances delivering pipes from being crushed between the door and the main casing is provided in the housing chamber in the area of the housing chamber close to the hinging axis of the door.

According to an embodiment, the nozzle comprises at least two separable components, wherein a first component consists of a collector element, which protrudes from the inner surface of the door and is arranged for connection with the water delivery pipes and with the additive substances delivering pipes, and wherein a second component consists of a funnel-shaped dispensing element, which is placed downstream of the collector element and faces the seat and the collector element is provided with a plurality of inlet fittings for all the water delivery pipes and for all the additive substances delivering pipes, wherein the inlet fittings are obtained on a single side of the collector element.

BRIEF DESCRIPTION OF THE DRAWINGS

The features and the advantages of a machine for preparing and dispensing beverages according to the present invention will become apparent from the following description which refers to the attached figures, by way of a non-limiting example, wherein.

DETAILED DESCRIPTION OF THE INVENTION

Figure 1:
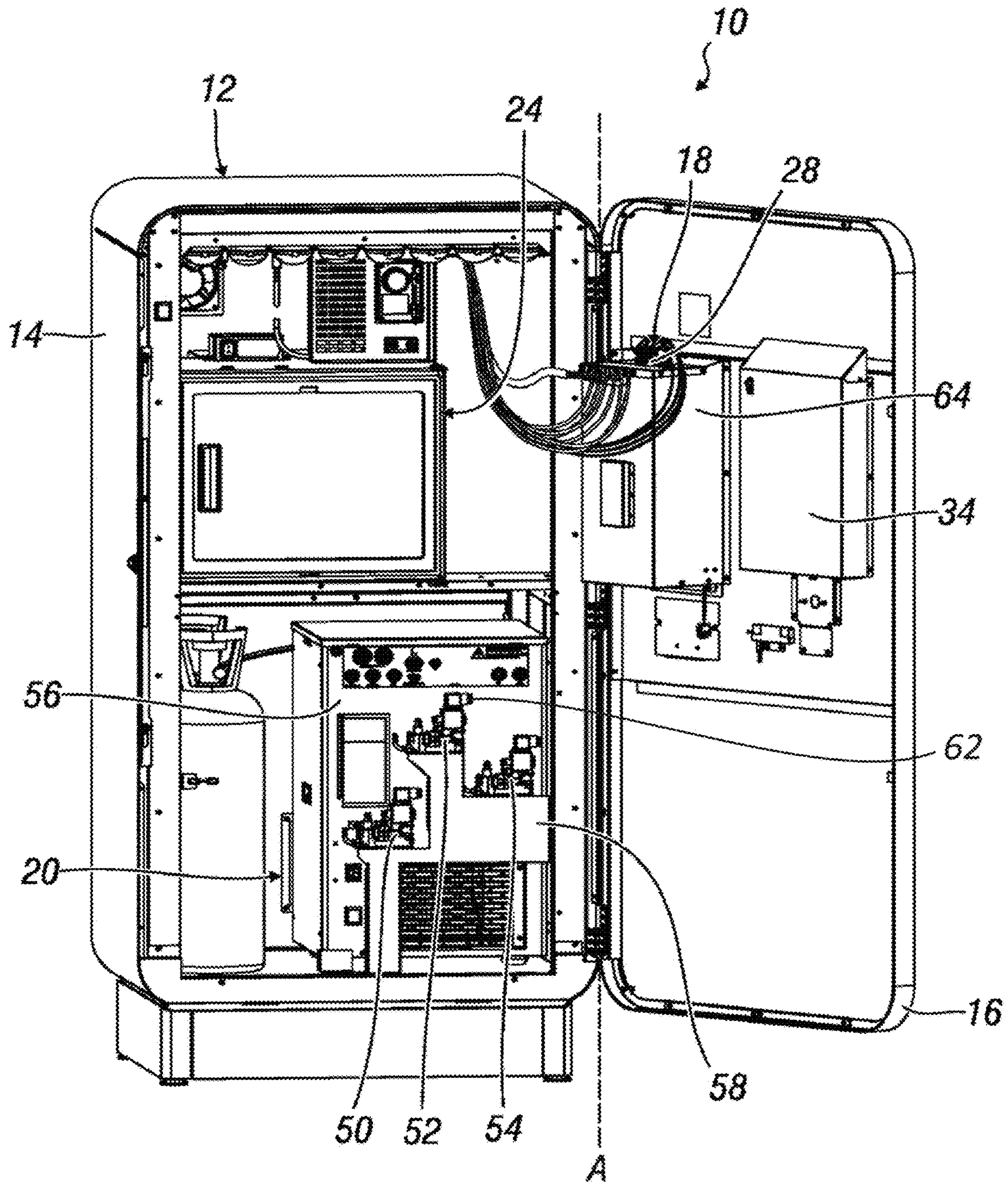
FIG. 1 is a perspective view illustrating a preferred embodiment of the machine for preparing and dispensing beverages according to the present invention, wherein the machine in illustrated with the opened-door configuration.

With reference to the figures, a preferred embodiment of a machine for preparing and dispensing beverages according to the present invention is shown. The machine is indicated, as a whole, with the reference number 10. The machine 10 is of the type comprising a main casing 12, able to define a housing chamber. Such a main casing 12 is preferably provided with at least one opening which defines a door compartment to the housing chamber and eventually with at least one lateral wall 14. This main casing 12, and in particular the housing chamber, encloses an inner volume suitable for housing a plurality of apparatuses of the machine 10.

The door 16 of the machine 10 is provided with an outer surface and an inner surface oriented towards the housing chamber, which is toward the inner volume of the machine 10. The door 16 is hinged to the main casing 12 at a hinging axis A, preferably having a substantial vertical development, and is configured to close the door compartment in the machine 10 operating configuration.

The machine 10 further comprises:

- at least one beverage preparation apparatus 18, which is designed for preparing and dispensing beverages;
- at least one water supply apparatus 20, which is provided with one or more water delivering pipes 22 to the beverage preparation apparatus 18; and
- at least one additive substances feeding apparatus 24, eventually to be mixed with water, which is provided with one or more additive substances delivering pipes 26 to the beverage preparation apparatus 18.

As an example, the additive substances to be mixed with water can be syrups, flavorings, mineral substances (magnesium, calcium, potassium, etc.), dissolved minerals, vitamins, coffee extracts (caffeine or more), the extracts, fruit juice, etc. The additive substances can be contained in specific containers, such as "bag-in-box" containers. These containers can be inserted in the additive substances feeding apparatus 24 and can be removed when empty.

The beverage preparation apparatus 18 comprises at least one mixing and dispensing nozzle 28 and at least one alcove 64, which is obtained on the door 16 and which defines a seat 66, open on the outer surface of the same door 16, to hold at least one container into which the beverage dispensed through the nozzle 28 flows. Thus, each user of the machine 10 can put in the seat 66 of the alcove 64 a container (glass, cup, bottle, canteen, etc.) to receive the desired beverage. The selection of the kind of beverage to be dispensed can be done by a control panel of the machine 10, which is usually disposed on the outer surface of the door 16, near the alcove 64. On the same outer surface of the door 16 a payment device of the beverages can be provided.

The water supply apparatus 20 is provided with one or more solenoid valves 50, 52, 54 (FIG. 1) each coupled to a respective water delivery pipe 22 to the beverage preparation apparatus 18. According to the invention, the solenoid valves 50, 52, 54 are positioned within the housing chamber at the door compartment of the main casing 12 to be immediately and easily accessible when the door 16 is open during respective adjustment and/or maintenance operations. According to the embodiment herewith described, the solenoid valves 50, 52, 54 are immediately accessible when the door 16 is open, because they are position in front of at least one or of all the other apparatuses arranged inside the main casing 12 of the machine 10, but different configurations can be used.

As known, the water supply apparatus 20 is provided with at least one water chilling unit 56, as well as of at least a water carbonator-soda maker. These devices are illustrated in the hydraulic diagram of FIG. 4. According to the embodiment herewith described, the solenoid valves 50, 52, 54 are positioned in front of the water chilling unit 56, such as to be more easily accessible, but different configurations can be used.

Figure 2:
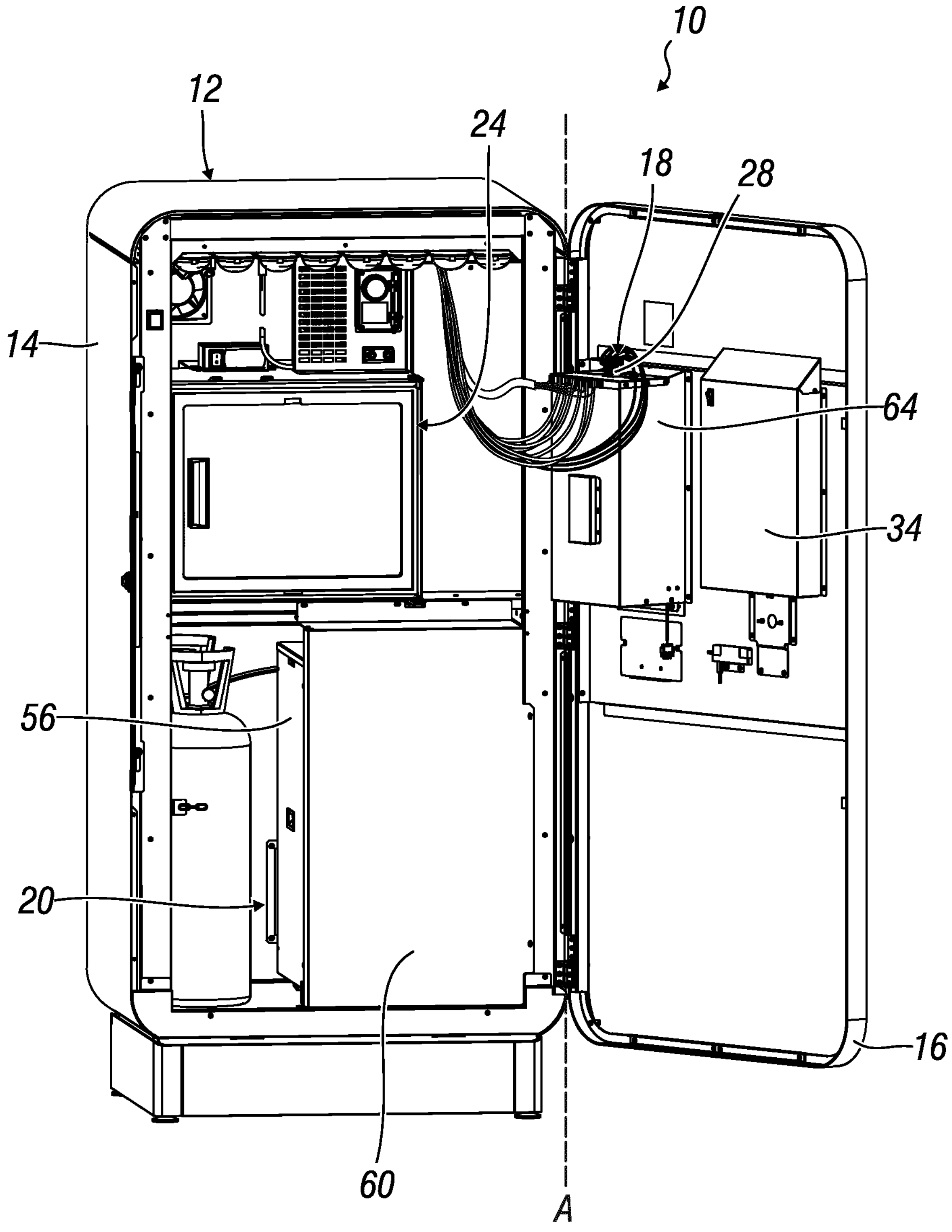
FIG. 2 is a further perspective view of the machine of FIG. 1.
Figure 3:
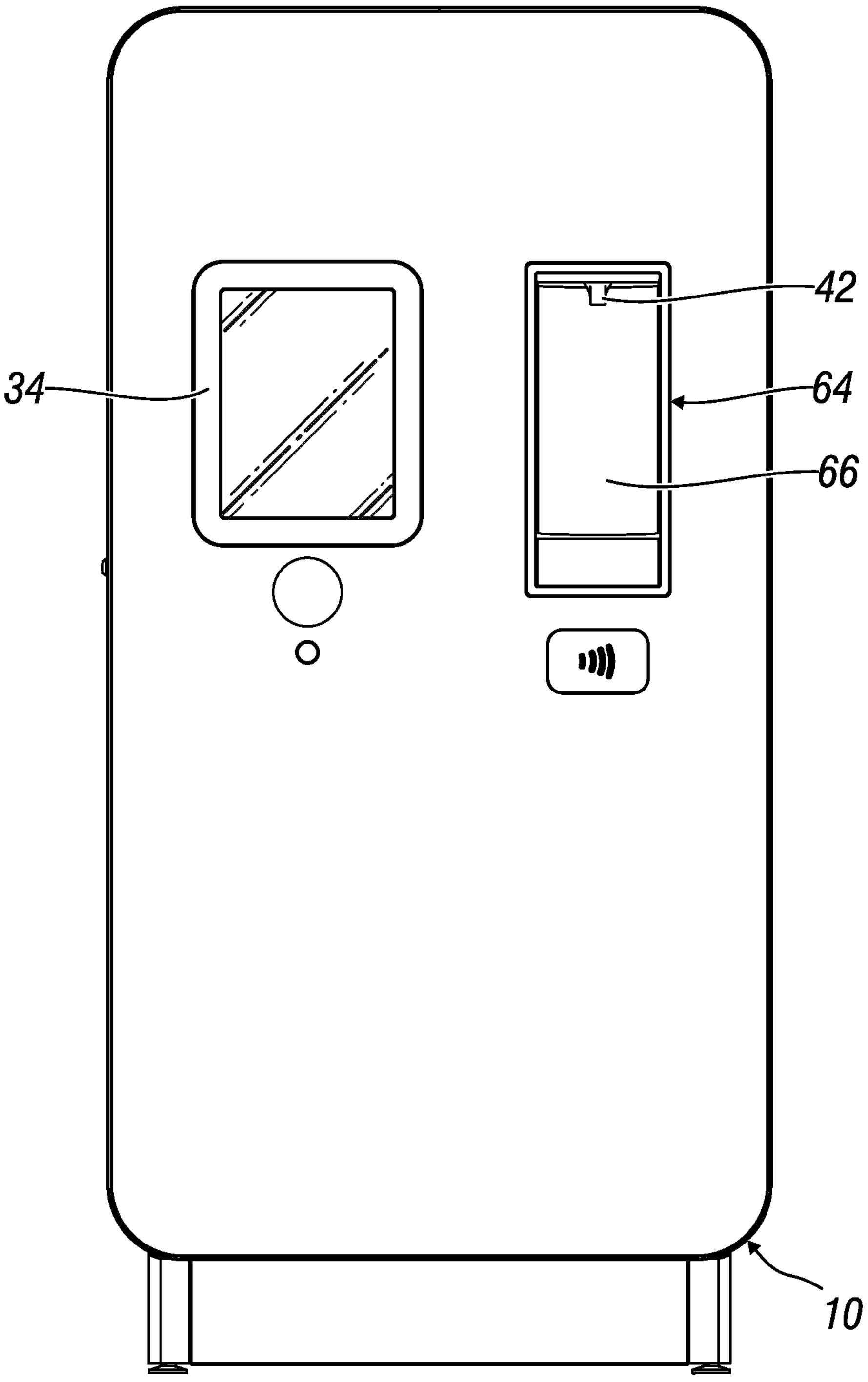
FIG. 3 is a front view of the machine of FIG. 1, wherein the machine is illustrated with the closed-door configuration.

As shown, the solenoid valves 50, 52, 54 can be mounted on a single support frame 58 (FIG. 1) which is arranged within the housing chamber at the door compartment of the main casing 12 so as to be opposite to the door 16 when the same door 16 is closed. The solenoid valves 50, 52, 54 can also be at least partially covered by a respective protection carter 60 (FIG. 2). The solenoid valves 50, 52, 54 can further be mounted at a different height from the others with respect to a support surface of the machine 10, so as to allow a more functional connection of the hydraulic tubes to said solenoid valves 50, 52, 54. For the same object, the water delivery pipes 22 are provided with respective delivery pipe portions 62 exiting from respective solenoid valves 50, 52, 54, wherein the delivery pipe portions 62 are oriented towards the hinging axis A of the door 16.

According to further embodiments, not illustrated, two or more support frames can be used to mount the solenoid valves on, or different kinds of mountings can be used.

Figure 4:
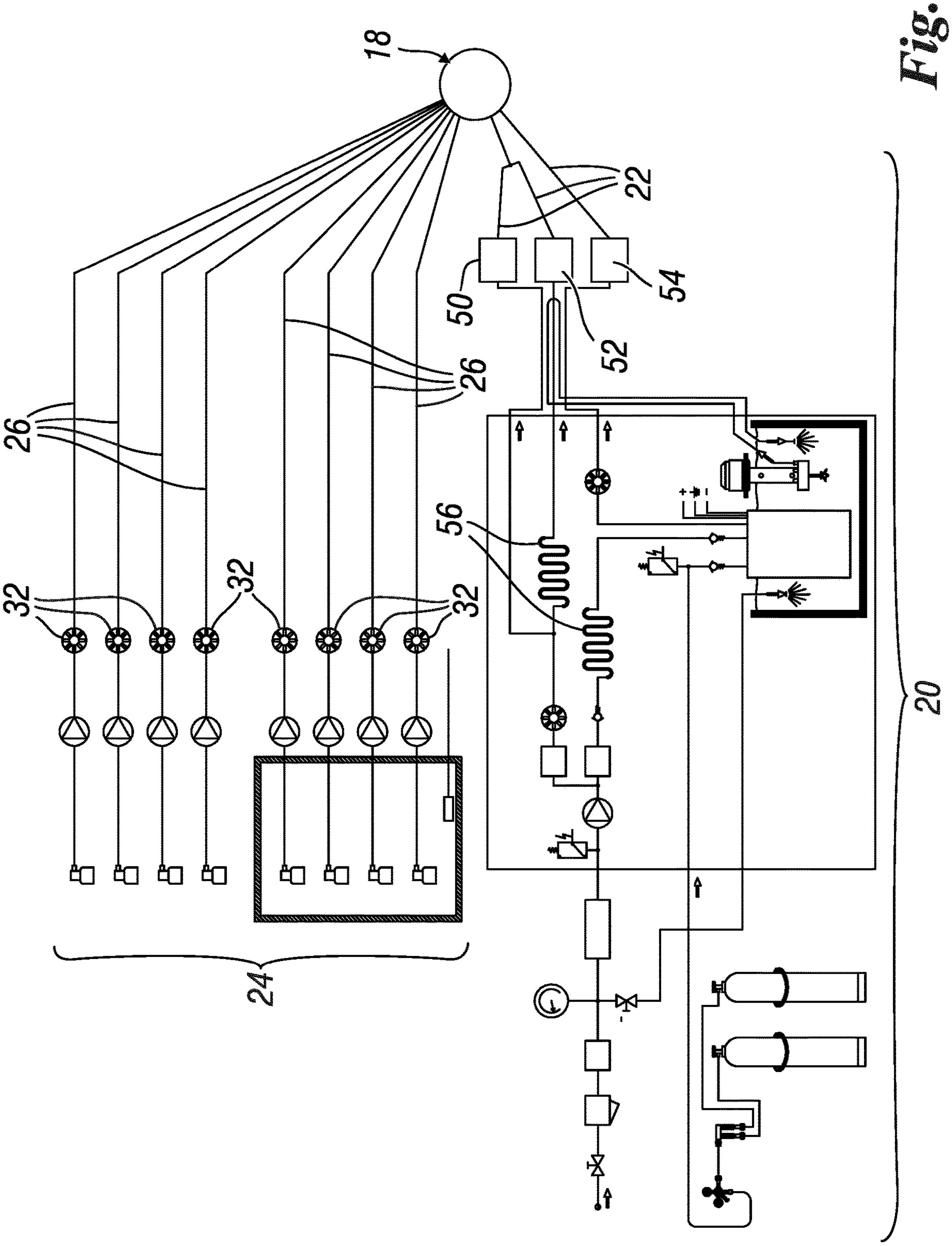
FIG. 4 shows the hydraulic diagram of the machine of FIG. 1.
Figure 5:
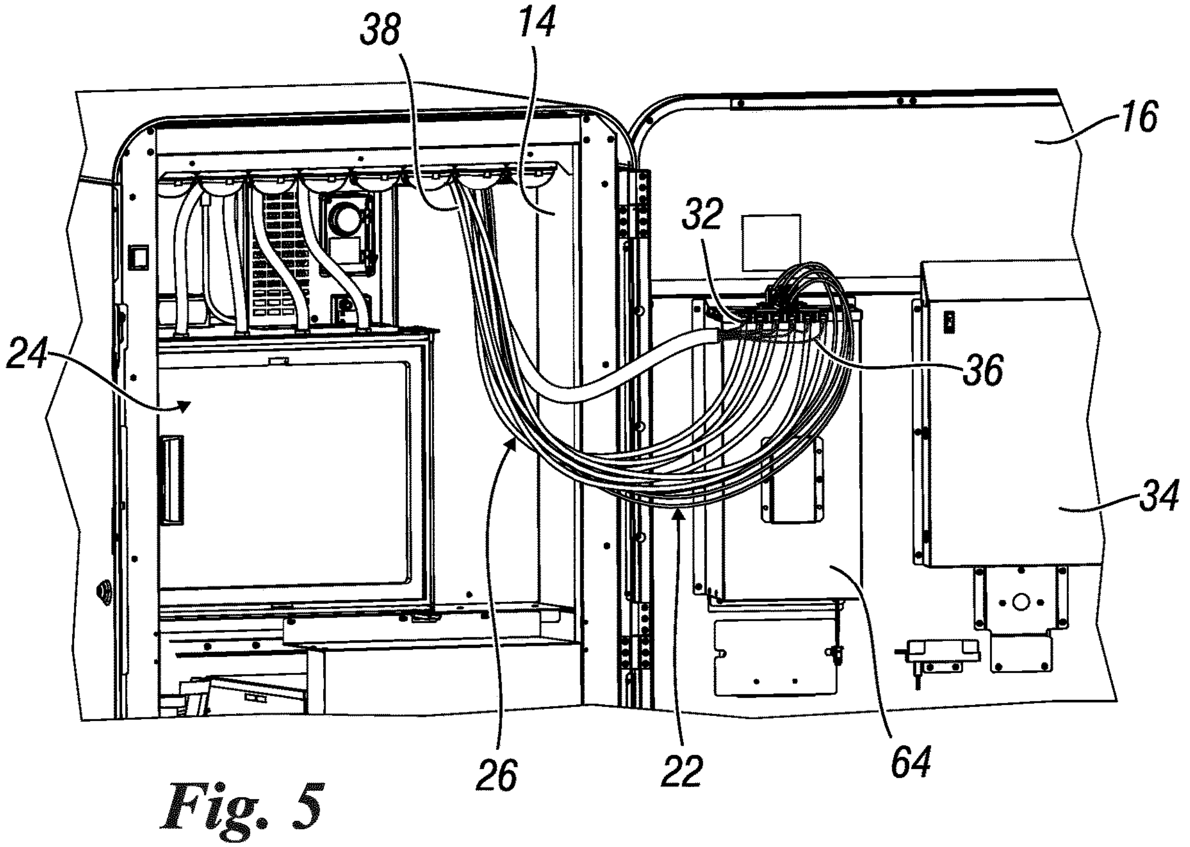
FIG. 5 is a detailed view of some apparatuses inside the machine of FIG. 1.

As illustrate in the hydraulic diagram of FIG. 4 and in the detailed view of FIG. 5, all the water delivery pipes 22 and all the additive substances delivering pipes 26 are hydraulically connected to the nozzle 28, which is designed for mixing water with the additive substances, so as to obtain the beverage, and for delivering the beverage. In particular, the water supply apparatus 20 and the additive substances feeding apparatus 24 are arranged in the housing chamber, so are hydraulically connected to the nozzle 28 by the aforementioned water delivery pipes 22 and additive substances delivering pipes 26. In the embodiment illustrated in the figures, the beverage preparation apparatus 18 comprises a single mixing and dispensing nozzle 28, but two or more nozzles can be provided according to the needs.

Conveniently, the nozzle 28 is fixed to the alcove 64 to ensure easy access to the machine 10 apparatuses and devices arranged within the housing chamber when the door 16 is open. Therefore, it is not necessary to provide a specific split in the alcove 64 to allow the passage of one or more nozzles, as in the known machines for preparing and delivering beverages where the nozzles are usually fixed to the main casing of the machine itself.

Figure 6:
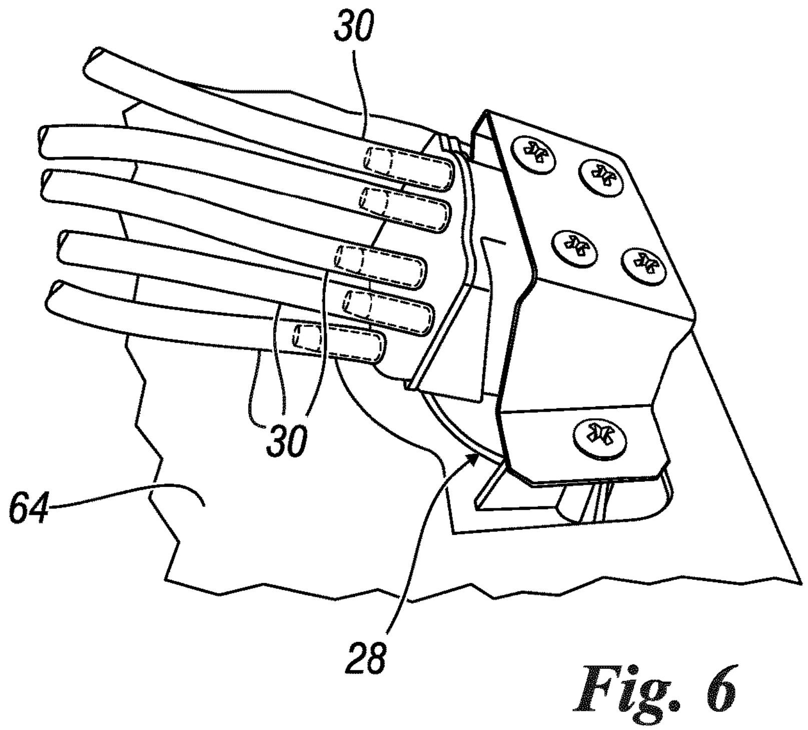
FIG. 6 is a further detailed view of some apparatuses inside the machine of FIG. 1.

As illustrated in FIGS. 5 and 6, the water delivery pipes 22 and the additive substances delivering pipes 26 are provided with respective pipe end portions 30 for connection to each the nozzle 28. The pipe end portions 30 can be grouped together so as to form at least one single end tube bundle placed at the nozzle 28 (as illustrated). The grouping of the pipe end portions 30 in a single position, specifically near the nozzle 28, further improves the accessibility to the apparatuses of the machine 10 when the door 16 is open.

As shown in the embodiment of the machine 10 in the figures, at least one part of the pipe end portions 30 is provided with one or more flow control devices 32 able to identify the passage of fluid in the pipe end portions 30, which are electrically connected to an electronic control unit 34 of the machine 10. Such flow control devices 32 can also be provided if the pipe end portions 30 are not grouped as above described. When said pipe end portions 30 are grouped, these flow control devices 32 can be electrically connected to an electronic control unit 34 of the machine 10 by means of respective electric cables 36 incorporated in the same single tube bundle which groups the pipe end portions 30. As an example, the pipe end portions 30 can be made by flow meters able to determine the presence and/or the passage of fluid in the respective pipe end portions 30 arranged closely to the nozzle 28.

According to an embodiment, as illustrated in FIG. 5, said flow control devices 32 are coupled to the alcove 64, so as to further improve accessibility to the apparatuses of the machine 10 when the door 16 is open.

With reference to the same FIGS. 5 and 6, the water delivery pipes 22 and the additive substances delivering pipes 26 are provided with respective pipe intermediate portions 38. The pipe intermediate portions 38 are grouped and joined together in an area of the main casing 12, in particular of the housing chamber, close to the hinging axis A of the door 16. Therefore, even these pipe intermediate portions 38 can form respective intermediate tube bundles that occupy the least possible space inside the main casing 12, or the housing chamber, improving accessibility to the apparatuses of the machine 10.

As illustrated in FIG. 5, when the door 16 is open, both the intermediate tube bundle of the water delivery pipes 22 and the intermediate tube bundle of the additive substances delivering pipes 26 come out from the upper corner of the main casing 12, or of the housing chamber, placed at the hinging axis A of the door 16, to connect to the nozzle 28. In other words, either the intermediate tube bundle of the water delivery pipes 22 and the intermediate tube bundle of the additive substances delivering pipes 26 are arranged within the main casing 12, within the housing chamber, in a position which is as far away as possible from the door compartment, so as not to hinder access to the apparatuses of the machine 10 in any way.

Figure 9:
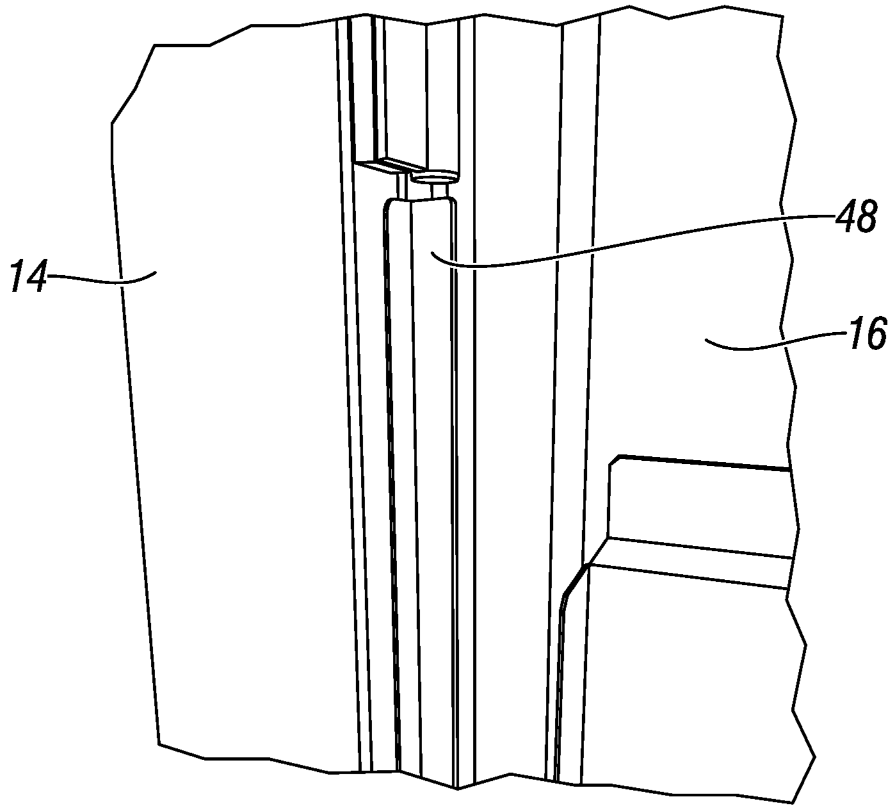
FIG. 9 is a detailed view of a component inside the machine of FIG. 1.

At least one protection element 48 to prevent the water delivery pipes 22 and the additive substances delivering pipes 26 from being crushed between the door 16 and the main casing 12 is provided in the housing chamber in the area of the main casing 12 close to the hinging axis A of the door 16. As illustrated in FIG. 9, this protection element 48 can be made by a metallic slat which is hinged to the main casing 12 at and parallel to said hinging axis A of the door 16.

Figure 7:
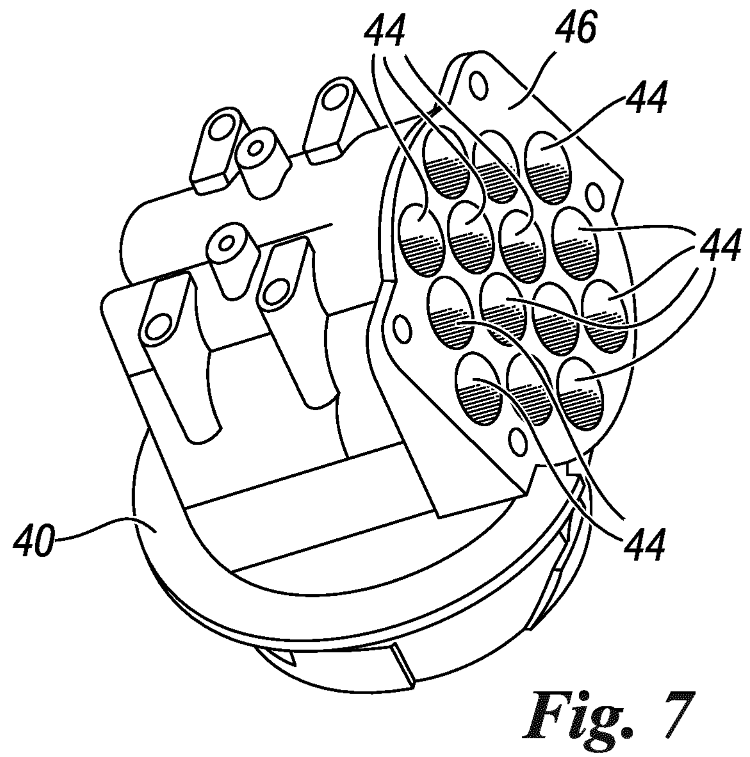
FIGS. 7 and 8 respectively show a first and a second component of the dispensing nozzle of the machine of FIG. 1.
Figure 8:
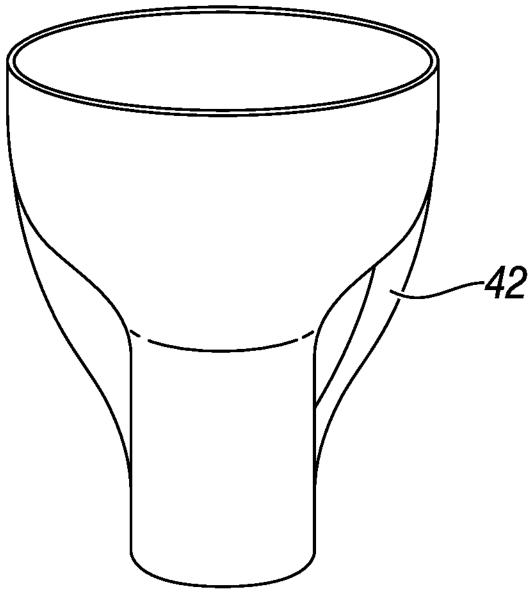

As illustrated in FIGS. 7 and 8, each nozzle 28 comprises at least two separable components. A first component consists of a collector element 40 (FIG. 7), which protrudes from the inner surface of the door 16 and is arranged for connection with the water delivery pipes 22 and with the additive substances delivering pipes 26. The second component consists of a funnel-shaped dispensing element 42, which is placed downstream of the collector element 40 and faces the seat 66 in the alcove 64. In detail, the lower tapered part of the funnel-shaped dispensing element 42 protrudes inside the seat 66 obtained in the alcove 64 to dispense the drinks into the containers that each user of the machine 10 inserts in the alcove 64 itself.

The collector element 40 of each nozzle 28 can be provided with a plurality of inlet fittings 44 for all the water delivery pipes 22 and for all the additive substances delivering pipes 26. These inlet fittings 44 are conveniently obtained on a single side 46 of the collector element 40

According to an embodiment, this single side 46 is spaced from the inner surface of the door 16, for example parallel and opposite to the inner surface of the door 16 or inclined with respect to the same, so as to rationalize the hydraulic connection between the water delivery pipes 22 and the additive substance delivery pipes 26 with the respective nozzle 28.

According to an embodiment, the machine 10 according to the present invention can be provided with suitable pumping devices for the water and/or for the additive substances, for example peristaltic pumps. As illustrated in FIGS. 1, 2 and 5, these pumping devices (not numbered) are arranged within the housing chamber of the main casing 12 at the door compartment of the main casing 12 to be immediately and easily accessible when the door 16 is open during respective adjustment and/or maintenance operations.

The pumping devices can also be arranged in front of at least one or all the other apparatuses in the main casing 12 of the machine 10, being immediately accessible once the door 16 is opened.

In particular, these pumping devices can be arranged in the upper portion of the housing chamber, thus allowing an optimal arrangement of the water delivery pipes 22, of the additive substances delivery pipes 26 and of the flow control devices 32, or of portions of the same or of the relative bundles, so as to rationalize the connection with the nozzle 28. Furthermore, the pumping devices can furthermore be mounted at the same height with respect to a support surface of the machine 10, as illustrated and preferred, or each at a different height from the others.

These pumping devices can therefore be operatively connected with the flow control devices 32, or with the electronic control unit 34 of the machine 10.

According to further embodiments, not shown, the pumping devices can be positioned according to different methods with respect to what is described above.

Therefore, the machine for preparation and dispensing of beverages according to the present invention achieves the aforementioned objects.

The machine for preparation and dispensing of beverages according to the present invention it is in any case susceptible to numerous modifications and variations, all falling within the same innovative concept; for example, combinations of the described embodiments can also be made and furthermore all the details can be replaced by technically equivalent elements. In practice, the materials used, as well as the shapes and dimensions, may be any according to the technical requirements.

LIST OF REFERENCES

10: machine;
12: main casing of the machine;
14: lateral wall of the main casing;
16: door;
18: beverage preparation apparatus;
20: water supply apparatus;
22: water delivering pipes;
24: additive substances feeding apparatus;
26: additive substances delivering pipes;
28: mixing and dispensing nozzle;
30: pipe end portions for connection to said nozzle;
32: flow control devices;
34: electronic control unit of the machine;
36: electric cables;
38: pipe intermediate portions;
40: collector element of the nozzle;
42: dispensing element of the nozzle;
44: inlet fittings of the collector element;
46: single side of the collector element;
48: protection element of pipes;
50: solenoid valve;
52: solenoid valve;
54: solenoid valve;
56: water chilling unit;
58: single support frame of the solenoid valves;
60: protection carter of the solenoid valves;
62: delivery pipe portions from solenoid valves;
64: alcove;
66: alcove seat;
A: hinging axis of the door.

The invention claimed is:

1. A machine for preparing and dispensing beverages comprising:

a main casing, able to define a housing chamber of a plurality of apparatuses of the machine and provided with at least one opening which defines a door compartment to said housing chamber;

at least one door, which is provided with an outer surface and an inner surface oriented towards said housing chamber, wherein said door is hinged to said main casing at a hinging axis and is configured to close said door compartment when in a machine operating configuration;

at least one beverage preparation apparatus, which is designed for preparing and dispensing beverages;

at least one water supply apparatus, which is provided with one or more water delivering pipes to said beverage preparation apparatus, and with one or more solenoid valves each coupled to a respective water delivery pipe; and at least one additive substances feeding apparatus, which is provided with one or more additive substances delivering pipes to said beverage preparation apparatus;

wherein said beverage preparation apparatus comprises:

at least one mixing and dispensing nozzle; and at least one alcove, which is obtained on said door and which defines a seat open on the outer surface of said door to hold at least one container into which the beverage dispensed through said nozzle flows;

wherein the solenoid valves are positioned within said housing chamber at the door compartment of said main casing to be immediately and easily accessible when said door is open during respective adjustment and/or maintenance operations, and wherein one or more of:

the solenoid valves are each mounted at a different height from the others with respect to a support surface of the machine, or the water delivery pipes are provided with respective delivery pipe portions exiting from respective solenoid valves, wherein said delivery pipe portions are oriented towards the hinging axis of said door.

2. The machine according to claim 1, wherein said solenoid valves are positioned in front of one or more of the apparatuses of the machine which are arranged within the housing chamber.

3. The machine according to claim 1, wherein said water supply apparatus is provided with at least one water chilling unit, wherein said solenoid valves are positioned in front of said water chilling unit.

4. The machine according to claim 1, wherein said solenoid valves are mounted on a single support frame which is arranged within said housing chamber at the door compartment of said main casing so as to be opposite to said door when said door is closed.

5. The machine according to claim 1, wherein said solenoid valves are at least partially covered by a respective protection carter.

6. The machine according to claim 1, wherein said solenoid valves are each mounted at a different height from the others with respect to the support surface of the machine.

7. The machine according to claim 1, wherein said water delivery pipes are provided with respective delivery pipe portions exiting from respective solenoid valves, wherein said delivery pipe portions are oriented towards the hinging axis of said door.

8. The machine according to claim 1, wherein said water supply apparatus and said additive substances feeding apparatus are arranged within said housing chamber and all the water delivery pipes and all the additive substances delivering pipes are hydraulically connected to said nozzle, which is designed for mixing water with said additive substances, so as to obtain the beverage, and for delivering said beverage, wherein said nozzle is fixed to said alcove to ensure easy access to the apparatuses of the machine arranged within said housing chamber when said door is open.

9. The machine according to claim 8, wherein said water delivery pipes and said additive substances delivering pipes are provided with respective pipe end portions for connection to said nozzle, wherein said pipe end portions are grouped together so as to form at least one single end tube bundle placed at said nozzle.

10. The machine according to claim 8, wherein said water delivery pipes and said additive substances delivering pipes are provided with respective pipe end portions for connection to said nozzle, wherein at least one part of said pipe end portions is provided with one or more flow control devices able to identify the passage of fluid in said pipe end portions, which are electrically connected to an electronic control unit of the machine.

11. The machine according to claim 10, wherein said one or more flow control devices are electrically connected to an electronic control unit of the machine by means of respective electric cables incorporated in said single tube bundle.

12. The machine according to claim 8, wherein said water delivery pipes and said additive substances delivering pipes are provided with respective pipe intermediate portions which are grouped and joined together in an area of the housing chamber close to the hinging axis of said door, in such a way that said pipe intermediate portions form respective intermediate tube bundles that occupy the least possible space inside the housing chamber, improving accessibility to the apparatuses of the machine.

13. The machine according to claim 12, wherein when said door is open, both said intermediate tube bundle of the water delivery pipes and said intermediate tube bundle of the additive substances delivering pipes come out from an upper corner of said housing chamber, placed at the hinging axis of said door, to connect to said nozzle.

14. The machine according to claim 8, wherein at least one protection element to prevent said water delivery pipes and said additive substances delivering pipes from being crushed between said door and said main casing is provided in the housing chamber in an area of the housing chamber close to the hinging axis of said door.

15. The machine according to claim 8, wherein said nozzle comprises at least two separable components, wherein a first component consists of a collector element, which protrudes from the inner surface of said door and is arranged for connection with said water delivery pipes and with said additive substances delivering pipes, and wherein a second component consists of a funnel-shaped dispensing element, which is placed downstream of said collector element and faces said seat and wherein said collector element is provided with a plurality of inlet fittings for all the water delivery pipes and for all the additive substances delivering pipes, wherein said inlet fittings are obtained on a single side of said collector element.

16. A machine for preparing and dispensing beverages comprising:

- a main casing, able to define a housing chamber of a plurality of apparatuses of the machine and provided with at least one opening which defines a door compartment to said housing chamber;
- at least one door, which is provided with an outer surface and an inner surface oriented towards said housing chamber, wherein said door is hinged to said main casing at a hinging axis and is configured to close said door compartment when in a machine operating configuration;
- at least one beverage preparation apparatus, which is designed for preparing and dispensing beverages;
- at least one water supply apparatus, which is provided with one or more water delivering pipes to said beverage preparation apparatus, and with one or more solenoid valves each coupled to a respective water delivery pipe; and
- at least one additive substances feeding apparatus, which is provided with one or more additive substances delivering pipes to said beverage preparation apparatus;
- wherein said beverage preparation apparatus comprises:
  - at least one mixing and dispensing nozzle; and
  - at least one alcove, which is obtained on said door and which defines a seat open on the outer surface of said door to hold at least one container into which the beverage dispensed through said nozzle flows;
- and wherein:
  - said solenoid valves are positioned within said housing chamber at the door compartment of said main casing to be immediately and easily accessible when said door is open during respective adjustment and/or maintenance operations,
  - said water supply apparatus and said additive substances feeding apparatus are arranged within said housing chamber and all the water delivery pipes and all the additive substances delivering pipes are hydraulically connected to said nozzle, which is designed for mixing water with said additive substances, so as to obtain the beverage, and for delivering said beverage,
  - said nozzle is fixed to said alcove to ensure easy access to the apparatuses of the machine arranged within said housing chamber when said door is open, said water delivery pipes and said additive substances delivering pipes are provided with respective pipe end portions for connection to said nozzle, and at least one part of said pipe end portions is provided with one or more flow control devices able to identify the passage of fluid in said pipe end portions, which are electrically connected to an electronic control unit of the machine.

17. The machine according to claim 16, wherein said one or more flow control devices are electrically connected to an electronic control unit of the machine by means of respective electric cables incorporated in said single tube bundle.

18. A machine for preparing and dispensing beverages comprising:

a main casing, able to define a housing chamber of a plurality of apparatuses of the machine and provided with at least one opening which defines a door compartment to said housing chamber;

at least one door, which is provided with an outer surface and an inner surface oriented towards said housing chamber, wherein said door is hinged to said main casing at a hinging axis and is configured to close said door compartment when in a machine operating configuration;

at least one beverage preparation apparatus, which is designed for preparing and dispensing beverages;

at least one water supply apparatus, which is provided with one or more water delivering pipes to said beverage preparation apparatus, and with one or more solenoid valves each coupled to a respective water delivery pipe; and at least one additive substances feeding apparatus, which is provided with one or more additive substances delivering pipes to said beverage preparation apparatus;

wherein said beverage preparation apparatus comprises:

at least one mixing and dispensing nozzle; and at least one alcove, which is obtained on said door and which defines a seat open on the outer surface of said door to hold at least one container into which the beverage dispensed through said nozzle flows;

and wherein:

said solenoid valves are positioned within said housing chamber at the door compartment of said main casing to be immediately and easily accessible when said door is open during respective adjustment and/or maintenance operations, said water supply apparatus and said additive substances feeding apparatus are arranged within said housing chamber and all the water delivery pipes and all the additive substances delivering pipes are hydraulically connected to said nozzle, which is designed for mixing water with said additive substances, so as to obtain the beverage, and for delivering said beverage, said nozzle is fixed to said alcove to ensure easy access to the apparatuses of the machine arranged within said housing chamber when said door is open, said water delivery pipes and said additive substances delivering pipes are provided with respective pipe intermediate portions which are grouped and joined together in an area of the housing chamber close to the hinging axis of said door, in such a way that said pipe intermediate portions form respective intermediate tube bundles that occupy the least possible space inside the housing chamber, improving accessibility to the apparatuses of the machine, and when said door is open, both said intermediate tube bundle of the water delivery pipes and said intermediate tube bundle of the additive substances delivering pipes come out from an upper corner of said housing chamber, placed at the hinging axis of said door, to connect to said nozzle.

19. A machine for preparing and dispensing beverages comprising:

a main casing, able to define a housing chamber of a plurality of apparatuses of the machine and provided with at least one opening which defines a door compartment to said housing chamber;

at least one door, which is provided with an outer surface and an inner surface oriented towards said housing chamber, wherein said door is hinged to said main casing at a hinging axis and is configured to close said door compartment when in a machine operating configuration;

at least one beverage preparation apparatus, which is designed for preparing and dispensing beverages;

at least one water supply apparatus, which is provided with one or more water delivering pipes to said beverage preparation apparatus, and with one or more solenoid valves each coupled to a respective water delivery pipe; and at least one additive substances feeding apparatus, which is provided with one or more additive substances delivering pipes to said beverage preparation apparatus;

wherein said beverage preparation apparatus comprises:

at least one mixing and dispensing nozzle; and at least one alcove, which is obtained on said door and which defines a seat open on the outer surface of said door to hold at least one container into which the beverage dispensed through said nozzle flows;

and wherein:

said solenoid valves are positioned within said housing chamber at the door compartment of said main casing to be immediately and easily accessible when said door is open during respective adjustment and/or maintenance operations, said water supply apparatus and said additive substances feeding apparatus are arranged within said housing chamber and all the water delivery pipes and all the additive substances delivering pipes are hydraulically connected to said nozzle, which is designed for mixing water with said additive substances, so as to obtain the beverage, and for delivering said beverage, said nozzle is fixed to said alcove to ensure easy access to the apparatuses of the machine arranged within said housing chamber when said door is open, and at least one protection element to prevent said water delivery pipes and said additive substances delivering pipes from being crushed between said door and said main casing is provided in the housing chamber in an area of the housing chamber close to the hinging axis of said door.

* * * * *